United States Patent [19]

Peleg

[11] 4,170,810

[45] Oct. 16, 1979

[54] FASTENING DEVICES FOR FLEXIBLE SHEETS

[76] Inventor: Alexander Peleg, Moshav Bitzaron, by Gdera, Israel

[21] Appl. No.: 876,555

[22] Filed: Feb. 9, 1978

[30] Foreign Application Priority Data

Feb. 17, 1977 [IL] Israel ....................................... 51474

[51] Int. Cl.[2] ............................................. A44B 21/00

[52] U.S. Cl. .................................. 24/243 K; 160/395; 52/222

[58] Field of Search ....................... 24/243 K; 52/222; 160/395, 392

[56] References Cited

U.S. PATENT DOCUMENTS

| | | | |
|---|---|---|---|
| 2,055,251 | 9/1936 | Duavall | 24/243 K |
| 2,335,361 | 11/1943 | Schiller | 160/395 |
| 2,597,401 | 5/1952 | Swanson | 160/395 |
| 3,757,479 | 9/1973 | Martinez | 52/222 |
| 3,811,454 | 5/1974 | Huddle | 160/395 |
| 3,818,550 | 6/1974 | Cresswell | 24/243 K |
| 3,987,835 | 10/1976 | Bloomfield | 24/243 K |

FOREIGN PATENT DOCUMENTS

| | | | |
|---|---|---|---|
| 1966057 | 8/1971 | Fed. Rep. of Germany | 52/222 |
| 2228923 | 12/1974 | France | 52/222 |
| 3988 | of 1899 | United Kingdom | 160/392 |

*Primary Examiner*—Bernard A. Gelak

*Attorney, Agent, or Firm*—Cantor and Singer

[57] ABSTRACT

The invention provides a device for securing a flexible sheet comprising (a) a first substantially U-shaped channel member having a web portion and a pair of opposed legs each of said legs being provided with a lip, which lips are directed substantially towards each other; (b) a second engaging member including a base and at least one depending arm, which member is adapted to engage one of the legs of said channel member with the back of the base of said engaging member facing the other leg of said channel member and the arm of said member disposed between said lip and said web; and (c) a third bar-like clamping member having a width substantially corresponding to the distance between the back of the base of said engaging member, when engaging one leg of said channel member, and the opposite leg of said channel member and a height along at least one of its sides substantially corresponding to the height of said channel member as measured between said lip and said web; the arrangement being such that upon the engagement of said engaging member with the leg of said channel member, with a flexible sheet passed therebetween and extending across said web and over said other leg, the insertion of said bar-like clamping member is adapted to cause the arm of said engaging member to tightly clamp said sheet against said leg and the web adjacent thereto, while one side of said clamping bar is adapted to simultaneously clamp said sheet against at least the other leg of said channel member while the opposite side of said clamping member is firmly pressed against the back of said engaging member's base.

9 Claims, 5 Drawing Figures

FASTENING DEVICES FOR FLEXIBLE SHEETS

The present invention relates to devices for securing a flexible sheet. More particularly the present invention relates to devices especially adapted for securing plastic sheets used as coverings for greenhouses, tunnels and the like installations used in agriculture as well as for temporary dismountable housing enclosures.

It is well known in the art that sheets of thermoplastic material are ideally suited due to their low cost, ease of transportation and mounting and demounting capabilities to act as a covering preventing the access of the elements to something being protected by the sheet, irrespective of whether the sheets are merely laid out to form tunnels over low growing plants or used to cover rigid tensioned frame structures as described in Israel Pat. No. 30801.

A major problem encountered in the use of said plastic sheet coverings is the finding of an optimum method for securing the same.

In Israel Pat. No. 28762 there is described a solution involving manufacturing a special sheet having thickened anchorage regions spaced around at least part of the margin of the sheet with a plurality of anchorage holes provided therein for tying down said sheet, however the costs of manufacturing such a sheet and the labor involved in securing all the anchorage holes and then releasing said sheet for transfer to another point makes said solution economically unfeasible for practical use.

An object of the present invention is to provide a device adapted for tightly securing a standard plastic sheet, which is commercially provided in rolls for said purpose, in a manner which assures that the sheet will not be pulled out of said securing device even when the sheet covering is subjected to winds and tensioning from different directions. Furthermore it is an object of the present invention to provide a device adapted to maximize the gripping surfaces holding said sheet in place and thereby avoiding point or line pressures being exerted on said sheet when tensioned, which pressures could damage the sheet and cause it to weaken or tear and thereby eliminate its protecting function as well as eliminate the possibility of economical reuse of said sheets.

In U.S. Pat. Nos. 2,986,150 and 3,811,454 there are described devices for fastening flexible membranes, however said patents relate only to the fastening of the edge of a membrane having a beaded edge and do not teach or suggest means for tightly securing a standard plastic sheet at any region along its surface without the need for specially producing beaded edges.

Other devices are also known in the art for clamping flexible sheets for agricultural covering use, such as the combination of a grooved member and complimentary gripping rod of the type described in U.S. Pat. No. 3,165,110, however, these devices suffer from the disadvantages that the flexible sheet is either held too loosely and has too much play and can consequently be pulled out from the device as a result of a strong wind acting against the sheet or that the sheet is held too tightly at specific pressure points resulting in damage to the sheets.

These and other disadvantages are overcome by the present invention which provides a device for securing a flexible sheet comprising (a) a first substantially U-shaped channel member having a web portion and a pair of opposed legs each of said legs being provided with a lip, which lips are directed substantially towards each other;

(b) a second engaging member including a base and at least one depending arm, which member is adapted to engage one of the legs of said channel member with the back of the base of said engaging emember facing the other leg of said channel member and the arm of said member disposed between said lip and said web; and (c) a third bar-like clamping member having a width substantially corresponding to the distance between the back of the base of said engaging member, when engaging one leg of said channel member, and the opposite leg of said channel member and a height along at least one of its sides substantially corresponding to the height of said channel member as measured between said lip and said web;

the arrangement being such that upon the engagement of said engaging member with the leg of said channel member, with a flexible sheet passed therebetween and extending across said web and over said other leg, the insertion of said bar-like clamping member is adapted to cause the arm of said engaging member to tightly clamp said sheet against said leg and the web adjacent thereto, while one side of said clamping bar is adapted to simultaneously clamp said sheet against at least the other leg of said channel member while the opposite side of said clamping member is firmly pressed against the back of said engaging member's base.

As will be realized because of the wedging, clamping interaction between the engaging member and the clamping member within the confines of the legs of the channel member the plastic sheet, irrespective of the thickness variations inherently resulting therein from manufacturing tolerances, is firmly clamped and secured without play along wide surface areas within the channel thereby assuring that weakening and damaging point or line pressures are not exerted thereon during the attachment process described hereinafter or as a result of tensioning during use due to wind and/or other pressures.

While the invention will now be described in connection with certain preferred embodiments with reference to the following illustrative figures so that it may be more fully understood it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the devices and their elements in more detail than is necessary for a fundamental understanding of the invention, the description taken with the drawings making apparent to those skilled in the art how the several forms of the invention may be embodied in practice.

Figure 1:
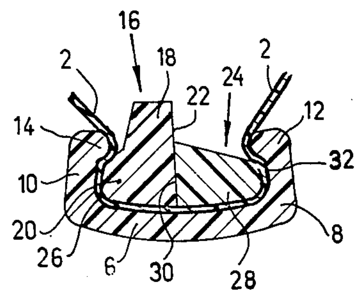
FIG. 1 is a cross-sectional view of three interengaged elements for one embodiment of a device according to the present invention.

Referring first to FIG. 1 there is illustrated one possible embodiment of a device for securing a flexible sheet 2 comprising a first substantially U-shaped channel member 4, having a web portion 6 and a pair of opposed legs 8, 10, each of said legs being provided with a lip 12, 14, which lips are directed substantially towards each other; a second engaging member 16 including a base 18 and at least one depending arm 20, which member 16 is adapted to engage one of the legs 10 of said channel member 4, with the back 22 of the base 18 of said engaging member facing the other leg 8 of said channel member and the arm 20 of said member disposed between said lip 14 and said web 6; and a third bar-like clamping member 24 having a width substantially corresponding to the distance between the back 22 of the base 18 of said engaging member 16, when engaging one leg 10 of said channel member, and the opposite leg 8 of said channel member 4, and a height along at least one of its sides 28 substantially corresponding to the height of said channel member as measured between said lip 12 and said web 6. The arrangement as seen is such that upon the engagement of said engaging member 16 with the leg 10 of said channel member 4, with a flexible sheet 2 passed therebetween and extending across said web and over said other leg 8, the insertion of said bar-like clamping member 24 is adapted to cause the arm 20 of said engaging member to tightly clamp said sheet against said leg 10 and the web portion 26 adjacent thereto while one side of said clamping bar 28 is adapted to simultaneously clamp said sheet against at least the other leg 8 of said channel member while the opposite side 30 of said clamping member is firmly pressed against the back 22 of said engaging member's base 18.

As seen with reference to the embodiment shown in FIG. 1 said bar-like clamping 24 can be substantially of trapezoidal cross-section and preferably at least one of the corners 32 of said bar like member is curved for better engagement, e.g., with the underside of lip 12 of leg 8. It will be realized however, that said clamping member can also have other cross-sectional shapes, e.g., that of a truncated oval.

Figure 2:
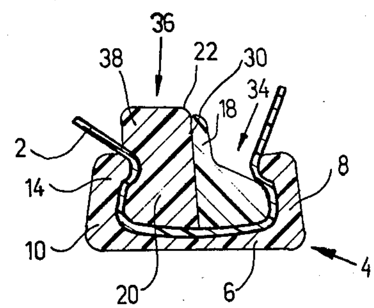
FIG. 2 is a cross-sectional view of another embodiment of a device according to the present invention; and FIGS. ***3a*, *3b* and *3c*** are cross-sectional views of sequential steps of interengagement of elements of a preferred device according to the present invention.

Referring now to FIG. 2 where like numerals have been used to indicate like parts as in FIG. 1 there is shown another possible embodiment of the present invention wherein the engaging member 36 is substantially C-shaped having a base 18 and two depending arms 20 and 38 wherein the lip 14 of the engaged leg 10 is adapted to be disposed between said arms 20 and 38. The arrangement here is such that upon the engagement of said engaging member 36 with the leg 10 of said channel member 4, with a flexible sheet 2 passed therebetween and extending across said web 6 and over said other leg 8, and the insertion of said clamping member 34, the inner surface of said C-member 36 is adapted to form additional clamping surfaces against said leg 10 and lip 14. Furthermore in the embodiment shown said clamping member 34 has an additional upwardly extending back-wall-section 38 adapted to abut the back 22 of said engaging member's 36 base 18.

Figure 3A:
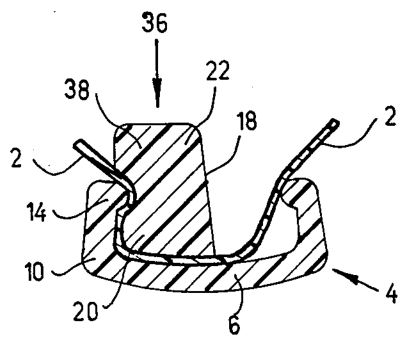

Referring now to FIGS. 3*a*, *b* and *c* there are illustrated cross-sectional views of the preferred manner and order of interengagement of elements of the device according to the present invention. Also in these figures like numerals have been used to indicate like parts as in FIGS. 1 and 2.

As seen in FIG. 3*a*, after flexible sheet 2 is draped within the channel member 4, engaging member 36 is positioned to engage leg 10 with the lip 14 of the engaged leg disposed between the arms 38 and 20 of said engaging member.

Figure 3B:
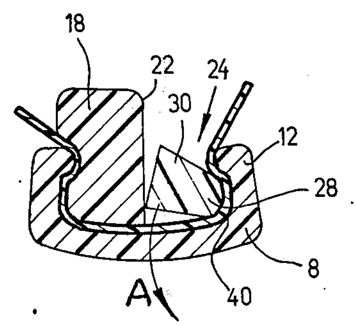
Figure 3C:
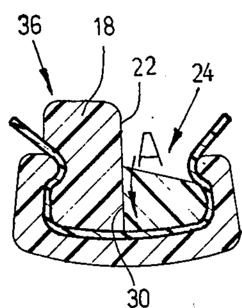

The second stage of preferred interengagement is shown in FIG. 3*b* wherein the clamping member 24 is first inserted with one of its sides 28 positioned against one leg 8 of said channel member between the lip 12 and the adjacent web portion 40 of said leg and then as shown in FIG. 3*c* said member 24 is frictionally rotated in the direction of arrow A with the opposite side 30 of said bar 24 bearing against the back 22 of said engaging member's base 18 whereby both said clamping member 24 and said engaging member 36 are adapted to tightly secure said sheet in said channel.

As can be seen with reference to all the figures in the preferred embodiments of the present invention, the back 22 of said engaging member's base 18 and the side 30,38 of the clamping member 24, 34 respectively which are adapted to abut thereagainst are complementarily angled with respect to a horizontal plane cut along the inner surface of said channel and said respective angles as preferably other than 90° with regard to said horizontal plane. Thus as seen with reference to all the figures and especially with reference to FIG. 3*a* the back 22 of said engaging member's 36 base 18 is so shaped that upon engagement of said member with one leg 10 of said channel member at least the lower portion of said back surface 22 is inclined away from said leg 10.

Of course it will be realized that other equivalent arrangements between the component elements of the device, which can further vary in size and shape are also possible. Thus for example element 36 could be provided with a stepped back wherein the whole back or only the lower stepped portion are angled. Similarly by varying the angles of curvature of the legs and lips of the channel element other interengaging relationships and angles of the component elements could be achieved.

As will readily be appreciated each of the component elements of the device according to the present invention can be manufactured as elongated profile strips or as short fastening units.

Furthermore while the legs of the U-shaped channel member are described as being provided with lips for sake of clarity and ease of understanding of the description it will be realized and understood that said term is in fact intended to denote a portion of the legs which inwardly protrude towards each other and are suitable for retaining the engaging and clamping elements.

Thus for example leg 10 could be merely inwardly inclined, while for better interaction with the clamping element it is preferred that leg 8 be inwardly curved as shown.

It will also be noted that the device of the present invention serves to clamp the flexible sheet 2 against tensions exerted on either side of said sheet and for this purpose it is especially preferred that the U-shaped channel member be at least semi-rigid to avoid the possibility of a pull on said sheet flexing either of the legs of said channel away from the engaging or clamping members and thereby allowing the sheet to be pulled free.

On the other hand it is preferred that the elements be flexible to a sufficient degree so that the ends of a device of several meters length can be bent towards each other to form a more readily and easily transportable coil, whereby a sheet can be attached to one or more devices of the present invention and then the whole assembly can be rolled into a coil and transported as a unit without the length of the uncoiled device constituting a problematic transporting factor.

While the members of the device can be made from many varied material they are preferably made from semi-rigid but flexible plastic such as PVC, which PVC will preferably be of a light color to avoid warming in the sun and subsequent thermal damage to the sheet.

While particular embodiments of the invention have been described and shown with reference to the figures it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embranced therein.

What is claimed is:

1. A device for securing a flexible sheet comprising (a) a first substantially U-shaped channel member having a web portion and a pair of opposed legs each of said legs being provided with a lip, which lips are directed substantially towards each other;

(b) a second engaging member including a base and at least one depending arm, which member is adapted to engage one of the legs of said channel member with a generally flat back of the base of said engaging member facing the other leg of said channel member and the arm of said member disposed between said lip and said web; and (c) a third bar-like clamping member having a width substantially corresponding to the distance between the back of the base of said engaging member, when engaging one leg of said channel member, and the opposite leg of said channel member and a height along at least one of its sides substantially corresponding to the height of said channel member as measured between said lip and said web, said bar-like member having a generally flat back wall section adapted to abut said back of said engaging member, and a curved corner adapted to engage the other leg of said channel member; said flat back portions when engaged being angled with respect to a central longitudinal plane normal to said web portion; the arrangement being such that upon the engagement of said engaging member with the leg of said channel member, with a flexible sheet passed therebetween and extending across said web and over said other leg, said clamping member is adapted to be first inserted with one of its sides positioned against one leg of said channel member between the lip and adjacent web of said leg and then to be frictionally rotated with the opposite side of said bar bearing against the back of said engaging member's base whereby the insertion of said bar-like clamping member is adapted to cause the arm of said engaging member to tightly clamp said sheet against said leg and the web adjacent thereto, while one side of said clamping bar is adapted to simultaneously clamp said sheet against at least the other leg of said channel member while the opposite side of said clamping member is firmly pressed against the back of said engaging member's base.

2. A device according to claim 1 wherein the back of said engaging member's base is so shaped that upon engagement of said member with one leg of said channel member at least the lower portion of said back surface is inclined away from said leg.

3. A device according to claim 1 wherein said U-shaped channel member is at least semi-rigid.

4. A device according to claim 1 wherein said engaging member is substantially C-shaped having a base and two depending arms wherein the lip of the engaged leg is adapted to be disposed between said arms, the arrangement being such that upon the engagement of said engaging member with the leg of said channel member, with a flexible sheet passed therebetween and extending across said web and over said other leg, and the insertion of said bar-like clamping member, the inner surface of said C-shaped member is adapted to form additional clamping surface against said leg and lip.

5. A device according to claim 1 wherein said bar-like clamping member is substantially of trapezoidal cross-section.

6. A device according to claim 1 wherein at least one of the corners of said bar-like member is curved.

7. A device according to claim 1 wherein said bar like clamping member has an additional upwardly extending back-wall-section adapted to abut the back of said engaging member's base.

8. A device according to claim 1 wherein said members are made of PVC.

9. A modification of the device of claim 1 wherein said substantially U-shaped channel member has a pair of legs wherein a first of said legs is angled inwardly towards the center of said channel while the second leg is provided with a lip which lip is directed substantially towards said first leg.

* * * * *